United States Patent [19]

Bytzek et al.

[11] Patent Number: 4,698,049
[45] Date of Patent: Oct. 6, 1987

[54] BELT TENSIONER WITH FRUSTOCONICAL PIVOT BEARING

[75] Inventors: Klaus K. Bytzek, Schomberg; John R. Antchak, Rexdale, both of Canada

[73] Assignee: Litens Automotive Inc., Downsview, Canada

[21] Appl. No.: 850,700

[22] Filed: Apr. 11, 1986

[51] Int. Cl.$^4$ .............................................. F16H 7/12
[52] U.S. Cl. ..................................... 474/135; 384/271
[58] Field of Search .............. 474/133, 135, 101, 113, 474/115, 109; 384/271

[56] References Cited

U.S. PATENT DOCUMENTS

| | | | |
|---|---|---|---|
| 2,732,267 | 1/1956 | Stover | 384/271 |
| 3,418,027 | 12/1968 | Asmanes | 384/271 |
| 4,473,362 | 9/1984 | Thomey et al. | 474/135 |
| 4,551,120 | 11/1985 | Thomey | 474/115 X |

Primary Examiner—Stephen J. Novosad
Assistant Examiner—Thuy M. Bui
Attorney, Agent, or Firm—Cushman, Darby & Cushman

[57] ABSTRACT

A belt tensioner in which the bearing for mounting the pulley carrying pivoted structure on the fixed structure comprises a frustoconical sleeve bearing having a frustoconical exterior surface and a frustoconical interior surface engaged between annular portions of the two structures. The frustoconical surface of one of the annular portions is (1) formed on the exterior periphery thereof and (2) disposed in engagement with the interior bearing frustoconical surface. The one annular portion has a load center point disposed on the pivotal axis of the pivoted structure. The other annular portion has a load center point disposed on a line disposed within a plane passing through the pivotal axis of the pivoted structure and the rotational axis of the pulley corresponding to the one line of the two lines of intersection of the bearing frustoconical surface with the plane through which the radially inward force component transmitted by the pivoted structure is applied to the sleeve bearing. The load center points are positioned such that the radially inward force component transmitted by the pivoted structure and resisted by the fixed structure is transmitted generally from one load center point to the other along a line extending between the points which line is perpendicular to and bisects the one line so that the radially inward force component transmitted by the pivoted structure to the sleeve bearing is distributed evenly throughout the axial extent of the sleeve bearing.

23 Claims, 7 Drawing Figures

BELT TENSIONER WITH FRUSTOCONICAL PIVOT BEARING

This invention relates to belt tensioners and more particularly to improvements in belt tensioners of the type employed in serpentine belt systems for automobile engines and the like.

For many years automobile accessories have been driven from the output shaft of the engine through the use of a series of V-belts. The usual arrangement was to provided a V-belt for each accessory and ti provide for the proper tensioning of the belt by adjustable mounting the accessory with respect to the engine itself. In recent years these multiple V-belt assemblies have been replaced by a single serpentine belt system. In this system a so-called poly-V belt is utilized instead of the tradiational V-belt. A poly-V belt is one which is much thinner in cross section and is capable of being disposed in driving engagement with a pulley in a reverse bend fashion, a capability which cannot be accomplished readily with a V-belt. This capability makes it possible to utilized a single endless belt which is capable of transmitting the drive from one pulley to three, four or more pulleys. Because this single belt system serves to drive a plurality of different driven pulleys, it becomes economically feasible to provide a belt tensioning pulley for the belt which will serve to maintain a generally constant tension on the belt and to permit all of the other driven pulleys to be fixed rather than having an adjustable mount.

The provision of a belt tensioning pulley presents the possibility of malfunction of the system by virtue of the malfunctioning of the tensioning pulley. A typical belt tensioning pulley assembly includes a fixed structure and a pivoted structure which is mounted on the fixed structure for pivotal movement about a first axis. The pivoted structure carries a belt engaging pulley which is mounted thereon for rotational movement about a second axis parallel to the first axis. A coil spring is connected between the fixed and pivoted structure to bias the pivoted structure away from a first limiting position toward a second limiting position.

In normal operation, the pivoted structure may have vibrational movements imparted thereto through the belt engaging pulley. These vibrational movements are reflected in the pivotal mounting of the pivoted structure on the fixed structure. The bearing which is provided for pivotally mounting the pivoted structure on the fixed structure must therefore be capable of extended operation without undue wear. The wear characteristics however are severely affected by the extent of axial offset of the pulley with respect to the bearing for the pivoted structure.

The belt load which acts upon the pulley is transmitted to the roller bearing assembly which mounts the pulley on the pivoted structure. The belt load applied to the pivoted structure can be considered to include a tangential force component which tends to move the pivoted structure about its pivotal axis and is resisted by the spring of the belt tenioner assembly. The belt load applied to the pivoted structure also includes a radially inward force component and it is this force component which must be resisted by the fixed structure through the bearing which mounts the pivoted structure on the fixed structure. This radially inwardly directed force component is applied to the pivoted structure at the center line of the bearing which rotatably supports the pulley. Where this force is offset axially from the axial position of the sleeve bearing, the latter is unevenly loaded tending to concentrate the force on a small arear so as to present a poor wear characteristic. Moreover, as wear increases, the concentration increases and the mounting will become quite wobbly and unsatisfactory.

It is an object of the present invention to alleviate the uneven wear characteristics noted above so as to prolong the operative life of the belt tensioning device and, hence, the entire system. In accordance with the principles of the present invention, this objective is obtained by utilizing a frustoconical sleeve bearing as the bearing means between the pivoted structure and the fixed structure. The frustoconical sleeve bearing utilized has a frustoconical exterior surface and a frustoconical interior surface. The pivoted structure includes an annular portion having a frustoconical surface engaging one of the bearing frustoconical surfaces for applying the radially inward force component transmitted to the pivoted structure to the sleeve bearing. The fixed structure includes an annular portion having a frustoconical surface engaging the other of the bearing frustoconical surfaces for resisting the radially inward force component applied to the sleeve bearing by the pivoted structure. The frustoconical surface of one of the annular portions is formed on the exterior periphery thereof and is disposed in engagement with the interior bearing frustoconical surface. The one annular portion has a load center point disposed on the first axis which is the axis of pivotal movement of the pivoted structure with respect to the fixed structure. The other annular portion has a load center point disposed on a line disposed within a plane passing through the first and second axes corresponding to the one line of the two lines of intersection of the bearing frustoconical surface with the plane through which the radially inward force component transmitted by the pivoted structure is applied to the sleeve bearing. The two load center points are positioned such that the radially inward force component transmitted by the pivoted structure and resisted by the fixed structure is transmitted generally from one load center point to the other along a line extending between the points which is perpendicular to and bisects the aforesaid one line so that the radially inward force component transmitted by the pivoted structure to the sleeve bearing is distributed evenly throughout the axial extent of the sleeve bearing.

The above relationship can be achieved in situations where the pulley is either co-extensive with a portion of the sleeve bearing or has only a slight amount of offset with respect thereto and the tensioner assembly does not utilize a radially inwardly applied spring force to achieve damping by sliding friction of the bearing as is taught in commonly assigned U.S. Pat. No. 4,473,362, the disclosure of which is hereby incorporated into the present specification. In accordance with the principles of the present invention, the utilization of a radially inwardly applied spring force for damping purposes may also be utilized to equalize the bearing load where the pulley is offset to a considerable extent. In accorfdance with the principles of the present invention, the damping force is provided in such a manner that it has a significant radially inward force component which acts on the pivoted structure at a position parallel to the belt load radially inward force component. Preferably, the damping radially inward force component is applied at a position so that it will be transmitted through the sleeve bearing at a position adjacent the fixed support for the tensioner device. The damping radially inward force component establishes with the belt load radially inward force compoenent a combined radially inwrd force component which acts in a position between the two radially inward force components which is proportional to the relative magnitudes thereof. It is this combined radially inward forced component which determines the loading of the bearing. In accordance with the principles of the present invention, the arrangement is such that the aforesaid load center points are positioned such that in at least one position of the pivoted structure between its limiting positions, the combined radially inward force component transmitted by the pivoted structure and resisted by the fixed structure, is transmitted generally from one load center point to the other along a line extending between the points which is perpendicular to and bisects the aforesaid one line so that the combined radially inward force component transmitted by the pivoted structure to the sleeve bearing is distributed evenly throughout the axial extent of the sleeve bearing.

Another object of the present invention is the provision of a belt tensioner of the type described which is simple in construction, effective in operation and econonmical to manufacture.

These and other objects of the present invention will become more apparent during the course of the following detailed description and appended claims.

The invention may best be understood with reference to the accompanying drawings wherein illustrative embodiments are shown.

Figure 1:
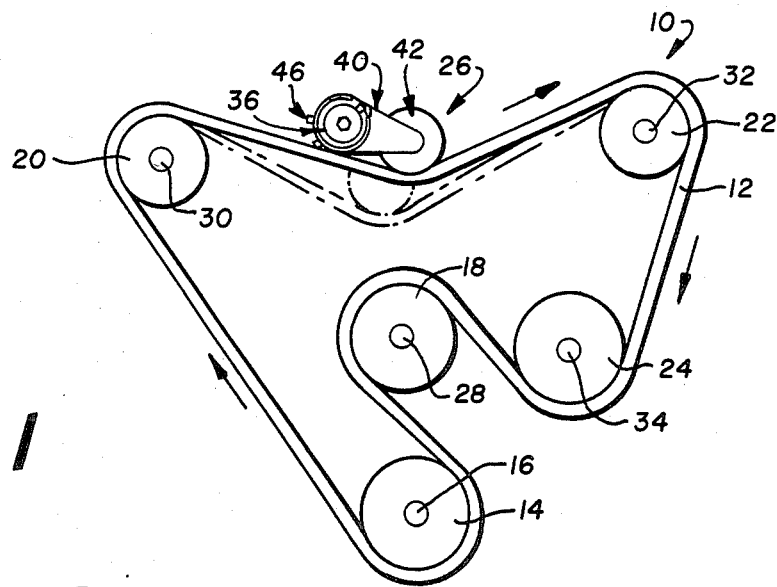
FIG. 1 is a front elevational view of a serpentine belt system embodying a belt tensioner constructed in accordance with the principles of the present invention.

Referring now more particulalrly to the drawings, there is shown in FIG. 1 thereof an automotive serpentine belt system, generally indicated at 10, which includes a relatively large endless poly-V belt 12, a drive pulley 14 connected to the output shaft 16 of the automobile engine, four driven pulleys 18, 20, 22 and 24 and a belt tensioner, generally indicated at 26 which embodies the principles of the present invention. The system 10, as shown, is exemplary of the type of system described in the above identified ASE paper, the disclosure of which is hereby incorporated by reference into the present specification for background purposes. In the arrangement shown, driven pulley 18 may be operatively connected with a shaft 28 for a cooling fan, driving pulley 20 may be mounted on a shaft 32 which forms a part of an alternator or the like and driven pulley 24 is mounted on a shaft 34 which forms a part of the air conditioning compressor. It will be understood that the belt 12 is trained about the various pulleys in the manner indicated in the drawings and the belt tensioner 26 is mounted in operative relation with the belt so as to be capable of moving into a position enabling the belt to be mounted on the other instrumentalities and then released to provide a desired tension to the belt in normal operative condition. The belt tensioner 26 also provides for the application of a substantially constant tension to the belt 12 of the system 10 over an extended period of time during which the belt tends to become longer. For example, the solid line position of the belt tensioner illustrates the initial condition of the belt with the best tensioner 26 in a minimum belt take-up position whereas the dotted line position illustrates a maximum belt take-up position which may occur after extended use and the belt has been elongated.

Referring now more particularly to FIGS. 2–6 of the drawings, the belt tensioner 26 of the present invention includes a fixed structure 36 which is adapted to be secured to a bracket plate 38 or the like in a stationary position with respect to the engine block. The belt tensioner 26 also includes a pivoted structure 40 which is mounted with respect to the fixed structure 36 for pivotal movement about a fixed axis between first and second limiting positions. The pivoted structure 40 carries a belt engaging pulley 42 for rotational movement about a second axis parallel with the first fixed axis. As ahown, a ball bearing assembly 44 serves to journal the pulley 42 on the pivoted structure. A coil spring 46 is mounted between the fixed structure 36 and pivoted structure 40 for resiliently biasing the latter to move in a direction away from the first limiting position thereof toward the second limiting position with a spring force which decreases as the pivoted structure is moved in a direction awat from the first position toward the second position. The second position of the belt tensioner 26 corresponds generally with the dotted line position shown in FIG. 1.

In accordance with the principles of the present invention the pivoted structure 40 is mounted on the fixed structure 36 for pivotal movement about the aforesaid first axis by a frustoconical bearing, generally indicated at 48. The angular slope of the frustoconical bearing is chosen in accordance with the principles hereinafter enunciated so as to distribute the load transmitted therethrough from the pivoted structure 40 to the fixed structure 36 evenly throughout the longitudinal extent of the bearing.

Figure 2:
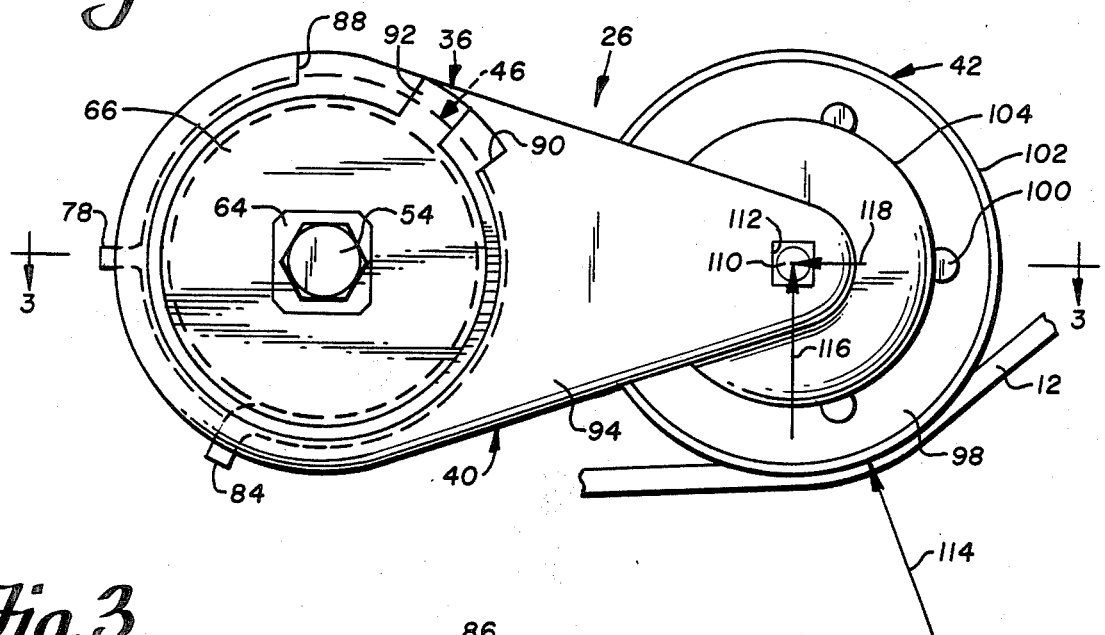
FIG. 2 is a front elevational view of the belt tensioner shown in FIG. 1 with the belt load schematically illustrated as it would be applied to the pulley axis of the pivoted structure, the tangential force component and radially inward force component of the belt load being also illustrated.
Figure 3:
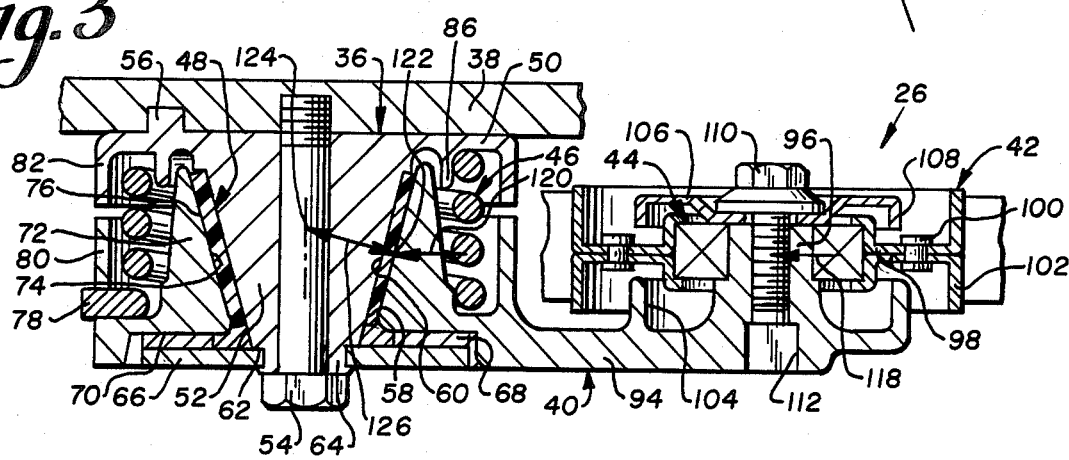
FIG. 3 is a sectional view taken along the line 3—3 of FIG. 2 showing the application of the radially inward force component and the direction which the force is resisted by the fixed structure so as to transmit the force component through the bearing with an even load distribution.

The fixed structure 36 in the embodiment shown in FIGS. 1-3 includes a main casting part providing a disk shaped mounting portion 50 having a central annular core portion 52 extending axially outwardly therefrom. The mounting portion 50 and core portion 52 are centrally apertured to receive a mounting bolt 54 therethrough which is threadedly engaged within the bracket 38. Bracket 38 is formed with a spaced recess for receiving a lug 56 formed integrally on the bracket engaging surface of the mounting portion 50. The engagement of the lug 56 within the bracket recess serves to locate the fixed structure in a predetermined angular relationship with respect to the axis of the bolt 54.

Core portion 52 is formed with a frustoconical exterior surface 58 which engages an interior frustoconical surface 60 of the bearing 48. While the engagement between the frustoconical surfaces 58 and 60 may be a sliding engagement, preferably, the two surfaces are bonded together as by adhesive, glue or the like. Alternatively, another preferred construction would be to lock the two surfaces together by a key and slot arranegement. For example, the bearing 48 may be molded with an integral key portion (not shown) extending inwardly from its interior surface 60 at an angular position corresponding with the angular position of engagement of the belt 12 with the pulley 42. This key position would extend substantially throughout the axial extent of the bearing and would engage within a corresponding recess in the surface 58 of the portion 52. The key portion would have a rectangular cross-section which may taper to provide an interference type mechanical lode.

The small end of the frustoconical core portion 52 defines an outwardly facing shoulder 62 at the end of surface 58 and a deformable free end portion 64 of square cross-sectional configuration extends axially outwardly of the shoulder 62. A circular plate 66 forming a part of the fixed structure 36 has a correspondingly shaped central aperture fitted over the square end portion 64. The portion 64 is swagged or otherwise deformed over the exterior surface of the plate 66 to secure its opposite surface in engagement with shoulder 62.

The inwardly facing outer marginal surface of the plate 66 engages a damping washer 68 which in turn, engages a cooperating damping surface 70 formed on the pivoted structure 40. The pivoted structure 40 includes a central annular portion 72 which is disposed axially inwardly of the surface 70. Annular portion 72 includes an interior frustoconical surface 74 which engages an exterior frustoconical surface 76 of the bearing 48.

Coil spring 46 is mounted over the exterior of the annular portion 72 of the pivoted structure 40 and includes a first bent end 78 which is positioned to extend outwardly through an opening in an outer peripheral wall portion 80 forming an integral part of the pivoted structure 40 in outwardly surrounding coaxial relation with respect to the central portion 72 thereof. The fixed structure includes a similar integral peripheral wall portion 82 which likewise is apertured to receive a second outwardly bent end 84 of the coil spring 46. As shown, the fixed structure 36 also includes an inner shorter annular wall portion 86 disposed within the adjacent portion of the coil spring 46.

The pivoted structure 40 includes an arcuate face portion extending laterally outwardly with respect to the exterior periphery of the damping surface 70 which includes spaced ends 88 and 90. A stop tab 92 extends radially from the plate 66 outwardly between the ends 88 and 90. The connection of the ends 78 and 84 of the spring 46 is such that the surface of end 88 on the pivoted structure 40 is biased to engage the adjacent surface of the stop tab 92 when the pivoted member has been fully extended into its second limiting position. When the spring 46 is stressed to its maximum extent the surface of end 90 engages the adjacent surface of stop tab 92 and the pivoted structure 40 is disposed in its first limiting position.

The pivoted structure 40 also includes a radially outwardly extending arm portion 94. Extending axially inwardly from the outer end of the arm portion 94 is an integral shouldered shaft portion 96. Ball bearing assembly 44 has its inner race seated on the shouldered shaft portion 96 and its outer race seated within the interior periphery of pulley 42. While pulley 42 may be fomed of any suitable construction, as shown, it is formed of two circular plates 98 fixed together in face-to-face abutting relation along their central annular portions as by rivets 100. The inner annular portions of the plates are bent outwardly and downwardly to form the bearing seat and the outer annular portions are bent outwardly, as indicated at 102, to form the belt engaging periphery.

As shown, the arm portion 94 is formed with an integral annular wall portion 104 which extends axially outwardly so that its inner end overlaps the adjacent side of the bearing seat portion of the pulley 42. A bearing shiled plate 106, having a similar peripheral wall portion 108 disposed in overlapping relation with the opposite side of the bearing seat portion of the pulley 42, is fixed to the shaft portion 96 as by a bolt 110. Bolt 110 is threadedly engaged within a central opening extending through the shaft portion the opposite end of which is formed with a square cross-sectional configuration, as indicated at 112, to receive a tool capable of pivoting the pivoted structure 40 into its first limiting position against the bias of spring 46 to facilitate the initial installation of belt 12 in the system 10.

With reference to FIGS. 1 and 2, it will be noted that the mounting of the spring 46 between the fixed structure 36 and pivoted structure 40 is such as to bias the pivoted structure 40 into a second limiting shown in phantom lines in FIG. 1 or in a position wherein end surface 88 on the pivoted structure 40 engages the adjecent surface of the stop lug 92 of the fixed structure 36. In assembling the serpentine belt system 10, a tool (not shown) is inserted within the square shaped opening 112 and the pivoted structure 40 is moved in a counterclockwise direction, as viewed in FIG. 2, into a first limiting position wherein the end surface 90 of the pivoted structure 40 engages the adjacent surface of the stop lug 92 of the fixed structure 36. In this first limiting position the belt 12 can be trained about all of the other pulleys of the serpentine system 10 since the tensioner is not applying tension to the belt. After the belt has been installed, the pivoted structure 40 is released by manipulation of the aforesaid tool allowing the spring 46 to bias the pivoted structure 40 in a clockwise direction, as viewed in FIGS. 1 or 2, into a position wherein the belt is tensioned to a desired load.

The tensioning load of the belt is transmitted to the tensioner pulley 42 in a direction which bisects the wrap angle of the belt with respect to the pulley 42. The belt load force and the direction in which it acts is illustrated by the arrow designated by the numeral 114 in FIG. 2. The belt load force 114 is transmitted through the pulley 42 and its bearing assembly 44 to the pivoted structure 40. The belt tension load 114 as it is transmitted to the pivoted structure 40 can be broken down into two forcr components, (1) a tangential force component designated by an arrow 116 in FIG. 2 which acts st the axis of rotation of the pulley 42 in a direction perpendicular to a line extending from the axis to the pivotal axis of the pivoted structure 40 and (2) a radially inward force component designated by the arrow 118 which acts on the rotational axis of the pulley 42 in a direction toward the pivotal axis of the pivoted structure 40. In FIG. 3 the radially inward force component 118 is shown applied to the pivoted structure 40 at the rotational axis of the pulley 42 in a position symmetrical with respect to the ball bearing assembly 44. The force component 118 is transmitted by the pivoted structure 40 to the frustoconical bearing 48 in an aligned position as indicated by an arrow 120, shown in FIG. 3.

It is noted that FIG. 3 is a cross-sectional view taken along the line 3—3 of FIG. 2 which extends through both the rotational axis of the pulley 42 and the pivotal axis of the pivoted structure 40. The cross-sectional view illustrated by FIG. 3 is therefore a view of the structure in a plane passing through both of the aforesaid axes. It will be noted that this plane intersects the exterior surface 76 of the frustoconical bearing 48 along two lines. Since the force component 120 is transmitted to the bearing in only one direction, it is appropriate to designate the application of that force along one of the aforesaid two lines appearing in FIG. 3.

In accordance with the principles of the present invention it is important in order to achieve a uniform distribution of the force component 120 along the axial extent of the frustoconical bearing 48, to insure that the load transmittal through the bearing is from the load center point 122 to a load center point 124 of the fixed structure along a force path indicated by the double-headed arrow 126 which is perpendicular to the line on which the point 122 occurs. The point 122 constitutes the axial midpoint of the aforesaid line on which it occurs. The force component 120 will be distributed evenly along the entire axial extent of the frustoconical bearing 48 as long as the above force transmittal relationship exists.

Figure 4:
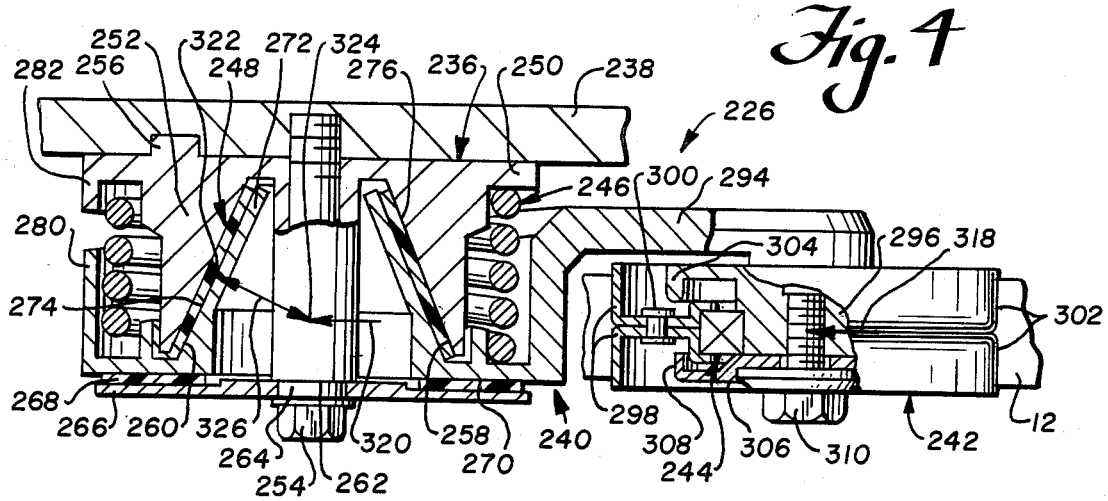
FIG. 4 is a view similar to FIG. 3 illustrating a modified arrangement for pivoting the pivoted structure on the fixed structure.

FIG. 4 depicts a modification of the belt tensioner 26, which illustrates essentially a reversal of the pivotal mount of the pivoted structure on the fixed structure. As shown, in FIG. 4, the modified belt tensioner is designated by the numeral 226 and the corresponding parts thereof are designated by correspondingly changing reference numerals. The significantly changed relationships are that the frustoconical bearing engaging surface 258 of fixed structure 236 constitutes an interior surface rather than an exterior surface and the frustoconical bearing engaging surface 274 of the pivoted structure 240 constitutes an exterior surface rather than an interior surface. The interior surface 258 of the fixed structure therefore engages the exterior frustoconical surface 276 of the bearing and the exterior surface 274 of the pivoted structure engages the interior frustoconical surface 260 of the bearing 248.

With the reverse mount arrangement as described above and illustrated in FIG. 4, the force transmittal of the pivoted structure 240 to the bearing 248 is along the line of bearing surface 260 farthest from the pulley 240 rather than nearest, as before. As before uniform load transmittal requires that the force component transmitted by the pivoted structure be applied at a load center 322 which is midway along the line. The reverse mount also establishes that the center load point 324 which lies on the pivotal axis of the pivoted structure 240 to be a load center point of the pivoted structure rather than the fixed structure, as before. With the above in mind, the radially inwardly belt force component 318 is illustrated as being translated to the load center 324. As before, the double arrow line 326 between the two center load points 322 and 324 is perpendicular to the line within which the load center point 322 is contained.

In connection with the unform loading of the frustoconical bearing 48 in the manner indicated above, it is contemplated by the present invention to manufacture the frustoconical bearing 48 or 248 so that the radius of the surface 76 or 260 in any given plane within the portions thereof extending 80° on opposite sides of the line on which point 122 or 322 occurs is slightly greater than the radius of the remaining arcuate extent. A relief of approximately 0.025 inches is sufficient to compensate for any expansion that may occur as a result of temperature changes. Moreover, it will be understood that the term frustoconical as herein applied with respect to the bearing 48 or 248 contemplates frustoconical bearings which are segmental. That is, it is possible to not only relieve the bearing as indicated but to actually cut off the relived portion of the bearing, although this is not preferred.

With both of the arrangements shown, damping can be provided by virtue of the pivotal sliding friction contact between the surface 74 or 274 of the pivoted structure 40 or 240 and the surface 76 or 276 of the frustoconical bearing 48 or 248 as well as the friction sliding surface contact between the damping washer 68 or 268 and the surface 70 or 270 of the pivoted structure 40 or 270. In the embodiments shown in FIGS. 1-3 and in FIG. 4 no particular arrangement has been provided for varying the force components effecting the aforesaid sliding surface frictional contact such as the proportional arrangement described in U.S. Pat. No. 4,473,362. Moreover, it will be noted that since the frictional contact between the damping washer 68 or 268 and the pivoted structure 40 or 240 is perpendicular to the force component 120 or 320 the latter is unaffected by the force components which act between the damping washer 68 or 268 and the surface 70 or 270 of the pivoted structure 40 or 240.

Similarly, while the spring load 114 remains generally constant as the operating position of the belt tensioner 26 moves from the solid line position shown in FIG. 1 to the dotted line position thereof, the relative magnitudes of the force components 116 and 118 will change, the directions in which they act remain the same and hence the point 122 at which the radially inwardly component 120 is transmitted to the bearing 48 remains the same. Consequently, with the arrangement as depicted in FIGS. 1-3, a force transmittal presenting an even load distribution to the bearing 48 is retained throughout the operating extent of the belt tensioner 26. The same is also true with the reverse mount arrangement of FIG. 4.

In this regard, it will be understood that it would be possible to mount the ends 78 and 80 of the spring 46 in such a way that the damping provided by the damping washer 68 is significantly greater than the damping provided by the bearing 48. This could be accomplished, for example, by choosing the material of the bearing 48 to have a relatively low coefficient of friction and the material of the damping washer 68 to have a relatively high coefficient of friction. Under these circumstances the operation of the damping washer 68 (or 268) would be such that a generally proportional damping in accordance with the teachings contained in U.S. Pat. No. 4,473,362 could be obtained.

Figure 5:
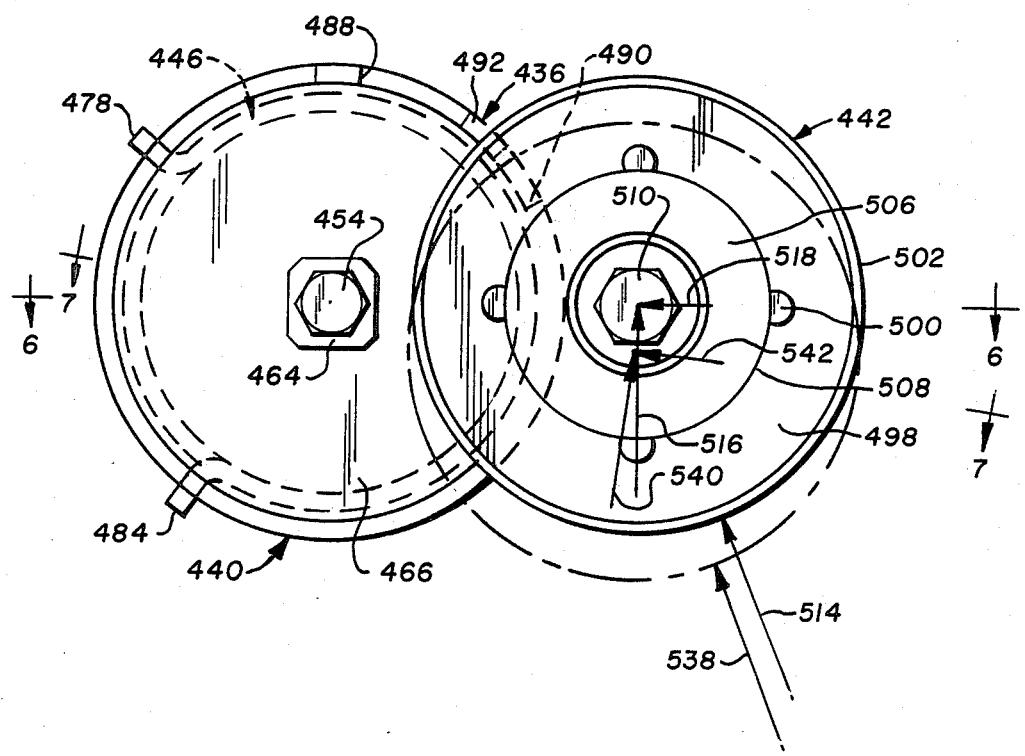
FIG. 5 is a view similar to FIG. 2 illustrating still another belt tensioner with proportional damping embodying the principles of the present invention, the belt tensioner being shown in solid lines in its initial startup position and dotted lines in its mid or neutral position.
Figure 6:
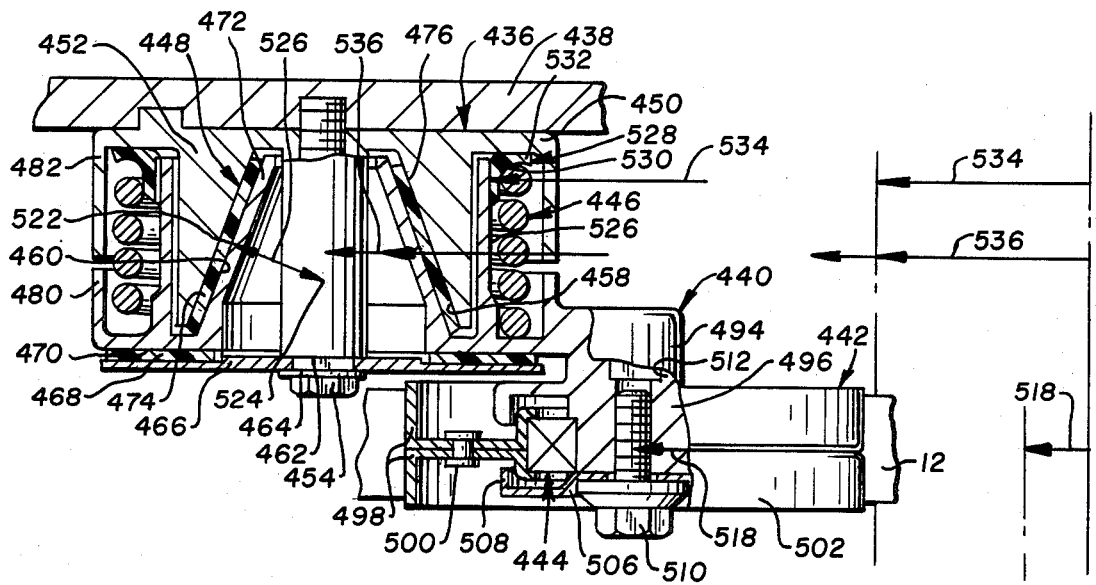
FIG. 6 is a sectional view taken along the line 6—6 of FIG. 5 showing schematically both the belt load radially inward force component and the damping load radially inward force component and the average or combined radially inward force component.
Figure 7:
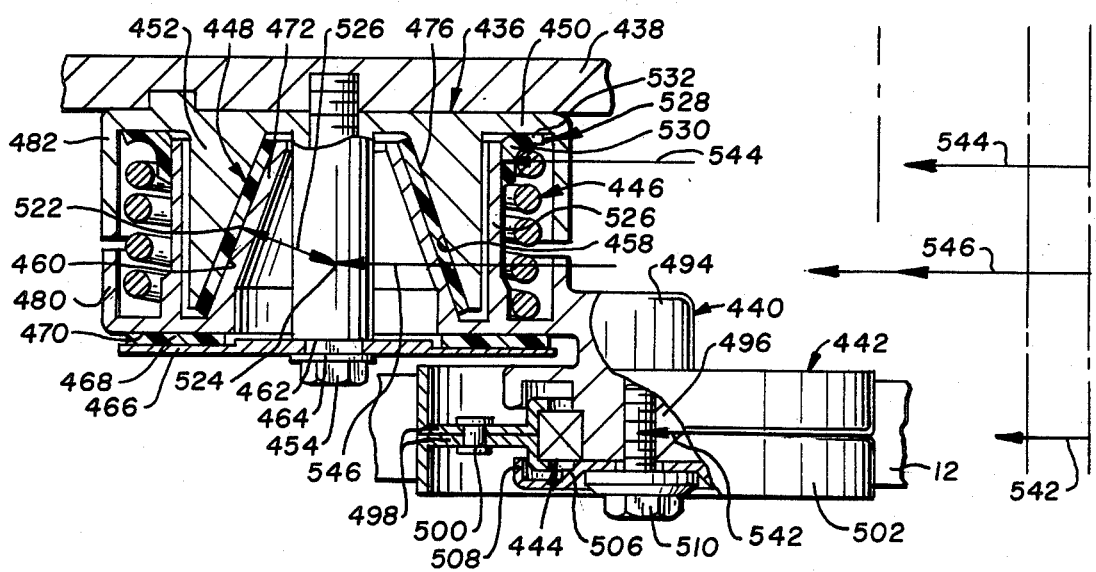
FIG. 7 is a sectional view taken along the line 7—7 of FIG. 5 with the force components illustrated therein.

It is preferred, however, to utilize the proportional damping arrangement depicted in the aforesaid patent which is achieved by variation in a radial spring provided damping force component since this force component may be utilized to help bring the belt load forces transmitted by the pivoted structure to the bearing into a more uniform relationship, especially where the pulley is carried by the pivoted structure in a more severe offset relation than that illustrated in FIGS. 1-4. FIGS. 5-7 illustrate a belt tensioner 426 similar to the belt tensioner 226 except that it embodies a more severe offset and proportional damping. Here again, rather than to repeat the description of all of the construction, corresponding parts are designated by numerals related as 426 is to 26.

The first basic difference embodied in the belt tensioner 426 is that the arm portion 494 of the pivoted structure 440 is shorter than the arm portion 40 or 240 and the shouldered shsft portion 296 extends axially outwardly beyond the fixed plate 466. This changed relationship enables the pulley 442 to be mounted entirely in an outwardly axially offset relation to the plate 466 of the fixed structure 436 so that ir can lap the same radially to accomodate the shorter distance between the pivotal axis of the pivoted structure 440 and the rotational axis of the pulley 442.

The second basic difference lies in the manner in which the spring 446 is mounted between the fixed structure 436 and pivoted structure 440 so as to achieve proportional damping. The pivoted structure includes an intermediate tubular wall portion 526 disposed between the outer peripheral wall portion 480 and the cenatrl frustoconical portion 472. The intermediate tubular portion 526 extends almost entirely within all the coils or volutes of the spring coil spring 446 so that its free end is disposed closely adjacent the mounting portion 450 of the fixed structure 436. Disposed in surrounding abutting relation to the free end of the intermediate tubular portion 526 is an annular spring support, generally indicated at 528. Spring support 528 is in the form of a ring of L-shaped cross-section including a cylindrical leg portion 530 which is engaged interiorly by the free end of the intermediate tubular portion 526 and exteriorly by the first coil or volute of the spring 446 extending from the end 478 thereof disposed within the aperture in the wall portion 482 of the fixed structure 436. The spring support 528 also includes a leg portion 532 extending radially outwardly from the leg portion 530 in a position to engage between the mounting portion 450 of the fixed structure 436 and the aforesaid first coil of the spring 446.

The arrangement of the spring support 528 is such that the tensioning of the spring 446 applies a radially inward force component to the leg portion 530 of the spring support. This force component is illustrated in FIG. 6 as an arrow 534 and it will be noted that ir is transmitted from the spring support to the free end of the intermediate tubular portion 526 of the pivoted structure at an axial position which bisects the adjacent volute and the leg portion 530. This axially inwardly directed force compoenent 534 is applied to the pivoted structure 440 at a position closely adjacent the support 438 for the fixed structure 436.

The belt tension load which is represented by the force arrow 514 in FIG. 5 can be considered transmitted to the pivoted structure 440 with a tangential force component 516 and a radially inward force component 518. As best shown in FIG. 6, the radially inward force component acts on the pivoted structure at a position axially offset from the axial extent of the bearing 448. The two radially inwardly directed force components 518 and 534 which act upon the pivoted structure 440 at different locations can be represented by a combined force component represented by the arrow 536 in FIG. 6. As shown in FIG. 6, the combined radially inward force component 536 has a magnitude equal to the combined magnitudes of the force components 518 and 534. The position at which the combined force component 536 acts is inbetween the two force components 518 and 534 at a position which is determined by the proportion of their magnitudes. As shown, the combined force component 536 when translated to the pivotal axis of the pivoted structure 440 is spaced axially inwardly from the load center point 524. The force component application shown in FIG. 6 corresponds with the operating positionof the belt tensioner 426 when the same is initially installed in the system 10. With reference to FIG. 1, the belt tensioner 426 would replace the belt tensioner 26 shown therein and the position of the unit, shown in solid lines in FIG. 5 and in FIG. 6, corresponds with the solid line showing of FIG. 1. It is noted, however, that the uniform bearing load relationship wherein the radially inward force component acts at the center load point 524 and in the direction of the double arrowed line 526 to the load point 522 of the frustoconical bearing 448 does not quite hold true.

FIG. 7 illustrates a situation where this uniform loading does occur and it represents an operating position of the belt tensioner 426 which is near the mid-point between the first and second limiting positions thereof, a position which is slightly beyond the initial operating position in a direction toward the second limitng position. This mid position is illustrated in phantom lines in FIG. 5 and it will be noted that belt load force represented by the force arrow 538 is applied in generally the same direction to the pulley 442 with a generally similar magnitude as the belt load 514. However, because of the changed position of the axis of rotation of the pulley, the tangential force component 540 acting on the pivoted structure 440 is of a reduced magnitude as compared with the tangential force component 516. This reduction in the tangential force component is commensurate with the reduction in the spring force component which opposes it due to the slightly extended position of the spring 446. By the same token, the radially inward force component represented by the arrow 542 has increased in magnitude compared with the force component 518. The radially inward force component of the constant belt load thus increases throughout the operative range of the movement of the belt tensioner as the pulley 442 thereof moves away from its first limiting position toward its second limiting position. In contrast, because the spring 446 is extending and the damping force applied thereby is diminishing the radially inwardly directed spring damping force component 534 decreases as the pivoted structure 440 moves toward its second limiting position.

In FIG. 7, the radially inwardly directed spring damping force component is represented by a force arrow 544 which is of reduced magnitude in comparison with the force component 534 and yet acts in exactly the same position. Still with reference to FIG. 7, it can be seen that when the reduced damping force component 544 is combined with the increased belt load force component 542, the resultant combined force component 546 now acts in a position intermediate the position in which the two force components act which coincides with the load center point 522 when translated to the pivotal axis of the pivoted structure 440.

It can thus be seen that the uniform load relationship depicted in FIG. 7 is a relationship which will be achieved only at one operating position of the belt tensioner 426. While it is within the contemplation of the present invention to have this one position occur in any desired operating position, the position chosen is preferred since it is closer to the initial operating position than the final operating position or second limiting position. In the normal operating life of the belt tensioner 426, the same will operate at a substantially greater period of time during its life at aposition near the initial operating position than at the final operating position. While the arrangement as depicted in FIGS. 5-7 does not provide for uniform loading througout the operating life of the bearing 448, it does provide for uniform loading at one position which occurs for an extended period of time throughout the total lifetime period. Moreover, a substantial uniform loading situation, such as indicated in FIG. 6, will occur through substantially the entire operating life of the belt tensioner. The arrangement is clearly preferable in a severe pulley offset situation, to the severe non uniform loading which would occur when only the belt load radially inward force component is transmitted through the bearing.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a belt tensioning device comprising a fixed structure, a pivoted structure, first bearing means mounting said pivoted structure on said fixed structure for pivotal movement about a first axis between first and second limiting positions, spring means acting between said fixed and pivoted structures for resiliently biasing said pivoted structure to move in a direction awat from said first limiting position toward said second limiting position with a spring load which decreases as said pivoted structure is moved in a direction away from said first position toward said second position, a belt engaging pulley, and second bearing means mounting said pulley on said pivoted structure for rotational movement about a second axis parallel with said first axis in such a way that a belt tension applied to said pulley will be transmitted to said pivoted structure with a tangential force component acting in a direction to be resisted by an opposed spring load force component and a radially inward force component acting in a direction to be resisted by said fixed structure through said first bearing means, the improvement which comprises said first bearing means comprising a frustoconical sleeve bearing having a frustoconical exterior surface and a frustoconical interior surface, said pivoted structure including an annular portion having a frustoconical surface engaging one of said bearing frustoconical surfaces for applying the radially inward force component transmitted to said pivoted structure to said sleeve bearing, the frustoconical surface of one of said annular portions being (1) formed on the exterior periphery thereof and (2) disposed in engagement with said interior bearing frustoconical surface, the pivotal movements of said pivoted structure with respect to said fixed structure being defined about said first axis by relative pivotal sliding friction contact between at least one of said bearing frustoconical surfaces with the frustoconical surface of the associated annular portion engaged thereby, said one annular portion having a load center point disposed on said first axis, the other of said annular portions having a load center point disposed on a line disposed within a plane passing through said first and second axes corresponding to the one line of the two lines of intersection of said bearing frustoconical surface with said plane through which the radially inward force component transmitted by said pivoted structure is applied to said sleeve bearing, said load center points being positioned such that the radially inward force component transmitted by said pivoted structure and resisted by said fixed structure is transmitted generally from one load center point to the other along a line extending between said points which is perpendicular to and bisects said one line so that the radially inward force component transmitted by said pivoted structure to said sleeve bearing is distributed evenly throughout the axial extent of said sleeve bearing.

2. The improvement as defined in claim 1 wherein said fixed structure includes a radially extending plate fixed in an axially outward position with respect to both of said annular portions so as to retain the latter in axially coextensive relation with respect to the bearing therebetween.

3. The improvement as defined in claim 2 wherein said plate is spaced axially from a radially extending surface on said pivoted structure and a damping washer is disposed in the space therebetween in engagement with said radially extending surface and an oppositely facing radially extending surface of said plate.

4. The improvement as defined in claim 3 wherein the annular portion of said pivoted structure is disposed inwardly of the annular portion of said fixed structure and the frustoconical surface of the annular portion of said pivoted structure is exterior thereof and engages the interior frustoconical surface of said bearing.

5. The improvement as defined in claim 3 wherein the annular portion of said fixed structure is disposed inwardly of the annular portion of said pivoted structure and the frustoconical surface of the annular portion of said fixed structure is exterior thereof and engages an intereior frustoconical surface of said bearing.

6. The improvement as defined in claim 1 wherein the annular portion of said pivoted structure is disposed inwardly of the annular portion of said fixed structure and the frustoconical surface of the annular portion of said pivoted structure is exterior thereof and engages the interior frustoconical surface of said bearing.

7. The improvement as defined in claim 1 wherein the annular portion of said fixed structure is disposed inwardly of the annular portion of said pivoted structure and the frustoconical surface of the annular portion of said fixed structure is exterior thereof and engages an interior frustoconical surface of said bearing.

8. The improvement as defined in claim 1 wherein said pivoted structure includes an arm portion having an axially extending shaft portion on the end thereof on which said pulley is journaled by said second bearing means, said arm portion having an annualr wall portion extending axially therefrom in lapped relation to the adjacent exterior of said second bearing means.

9. The improvement as defined in claim 8 wherein said shaft portion has a bearing shield plate fixed to the axially outer end thereof, said shield plate having an annular wall portion extending axially therefrom in lapped relation to the adjacent exterior of said second bearing means.

10. The improvement as defined in claim 3 wherein said pivoted structure includes an arm portion having an axially extending shaft portion on the end thereof on which said pulley is journaled by said second bearing means, said arm portion having an annular wall portion extending axially therefrom in lapped relation to the adjacent exterior of said second bearing means.

11. The improvement as defined in claim 10 wherein said shaft portion has a bearing shiled plate fixed to the axially outer end thereof, said shield plate having an annular wall portion extending axially therefrom in lapped relation to the adjacent exterior of said second bearing means.

12. The improvement as defined in claim 1 wherein said bearing is configured such that its radius in any radial plane passing therethrough is slightly greater in an arc extending approximately 80° in both directions from said one line containing the associated load center point than in the remaining arc thereof.

13. The improvement as defined in claim 12 wherein the difference in radius is approximately 0.025".

14. The improvement as defined in claim 3 wherein said bearing is configured such that its radius in any radial plane passing therethrough is slightly greater in an arc extending approximately 80° in both directions from said one line containing the assocaited load center point than in the remaining arc thereof.

15. The improvement as defined in claim 14 wherein the difference in radius is approximately 0.025".

16. In a belt tensioning device comprising a fixed structure, a pivoted structure, first bearing means mounting said pivoted structure on said fixed structure for pivotal movement about a first axis between first and second limiting positions, spring means acting between said fixed and pivoted structures for resiliently biasing said pivoted structure to move in a direction away from said first limiting position toward said second position, a belt engaging pulley, second bearing means mounting said pulley on said pivoted structure for rotational movement about a second axis parallel with said first axis in such a way that a belt tension load applied to said pulley will be transmitted to said pivoted structure with a tangential force component acting in a direction to be resisted by an opposed spring load force component and a radially inward force component acting in a direction to be resisted by said fixed structure through said first bearing means, and damping means for damping by friction surface sliding movements of said pivoted structure with a damping load which decreases as said pivoted structure is moved in a direction away from said first position toward said second position, said damping means including means for transmitting to said pivoted structure a damping load (1) which decreases as said pivoted structure is moved in a direction away from said first position toward said second position and (2) which includes a damping radially inward force component acting in a position parallel with said first mentioned radially inward force component so as to establish a combined radially inward force component acting in a position between the two inward force components which is proportional to the relative magnitudes thereof, the improvement which comprises said first bearing means comprising a frustoconical sleeve bearing having frustoconical exterior surface and a frustoconical interior surface, said pivoted structure including an annular portion having a frustoconical surface engaging one of said bearing frustoconical surfaces for applying the combined radially inward force component transmitted to said pivoted structure to said sleeve bearing, said fixed structure including an annular portion having a frustoconical surface engaging the other of said bearing frustoconical surfaces for resisting the combined radially inward force component applied to said sleeve bearing by said pivoted structure, the frustoconical surface of one of said annular portions being (1) formed on the exterior periphery thereof and (2) disposed in engagement with said interior bearing frustoconical surface, the pivotal movements of said pivoted structure with respect to said fixed structure being defined about said first axis by relative pivotal sliding friction contact between at least one of said bearing frustoconical surfaces with the frustoconical surface of the associated annular portion engaged thereby, said one annular portion having a load center point disposed on said first axis, the other of said annular portions having a load center point disposed on a line disposed within a plane passing through said first and second axes corresponding to the one line of the two lines of intersection of said bearing frustoconical surface with said plane through which the combined radially inward force component transmitted by said pivoted structure is applied to said sleeve bearing, said load center points being positioned such that in at least one position of said pivoted structure between said first and second limiting positions the combined radially inward force componenet transmitted by said pivoted structure and resisted by said fixed structure is transmitted generally from one load center point to the other along a line extending between said points which is perpendicular to and bisects said one line so that the combined radially inward force component transmitted by said pivoted structure to said sleeve bearing is distributed evenly through the axial extent of said sleeve bearing.

17. The improvement as defined in claim 16 wherein said fixed structure includes a radially extending plate fixed in an axially outward position with respect to both of said annular portions so as to retain the latter in axially coextensive relation with respect to the bearing therebetween.

18. The improvement as defined in claim 17 wherein said plate is spaced axially from a radially extending surface on said pivoted structure and a damping washer is disposed in the space therebetween in engagement with said radially extending surface and an oppositely facing radially extending surface of said plate.

19. The improvement as defined in claim 16 wherein the annular portion of said pivoted structure is disposed inwardly of the annular portion of said fixed structure and the frustoconical surface of the annular portion of said pivoted structure is exterior thereof and engages the interior frustoconical surface of said bearing.

20. The improvement as defined in claim 16 wherein said pivoted structure includes an arm portion having an axially extending shaft portion on the end thereof on which said pulley is journaled by said second bearing means, said arm portion having an annular wall portion extending axially therefrom in lapped relation to the adjacent exterior of said second bearing means.

21. The improvement as defined in claim 20 wherein said shaft portion has a bearing shield plate fixed to the axially outer end thereof, said shield plate having an annular wall portion extending axially therefrom in lapped relation to the adjacent exterior of said second bearing means.

22. The improvement as defined in claim 16 wherein said bearing is configured such that its radius in any radial plane passing therethrough is slightly greater in an arc extending approximately 80° in both directions from said one line containing the associated load center point than in the remaining arc thereof.

23. The improvement as defined in claim 22 wherein the difference in radius is approximately 0.025".

* * * * *